United States Patent [19]

Hidaka et al.

[11] Patent Number: 4,487,029
[45] Date of Patent: Dec. 11, 1984

[54] VARIABLE-DISPLACEMENT ROTARY FLUID COMPRESSOR AND AIR CONDITIONING SYSTEM USING THE COMPRESSOR

[75] Inventors: Yoshiaki Hidaka, Yokohama; Yasuhiro Niikura, Yokosuka, both of Japan

[73] Assignee: Nissan Motor Company, Limited, Yokohama, Japan

[21] Appl. No.: 467,602

[22] Filed: Feb. 18, 1983

[30] Foreign Application Priority Data

Feb. 24, 1982 [JP] Japan ............................ 57-29234

[51] Int. Cl.³ .................. B60H 3/04; F25B 27/00; F04B 9/00
[52] U.S. Cl. .................... 62/133; 62/176.3; 62/228.5; 62/229; 62/323.4; 417/319; 417/429; 418/212
[58] Field of Search .......... 417/319, 429, 359; 62/228.5, 230, 133, 323.4, 229, 176.3, 510; 418/69, 212, 209, 142; 236/1 EA; 192/106.1, 84 AA

[56] References Cited

U.S. PATENT DOCUMENTS

| | | | |
|---|---|---|---|
| 2,194,054 | 3/1940 | Peterson | 417/429 X |
| 2,889,691 | 6/1959 | Schjolin | 62/510 X |
| 3,102,398 | 9/1963 | Schjolin | 62/230 X |
| 3,735,847 | 5/1973 | Brucken | 192/106.1 X |
| 4,118,142 | 10/1978 | Hahs | 417/359 X |
| 4,257,238 | 3/1981 | Kountz et al. | 62/176.3 |
| 4,395,203 | 7/1983 | Takada | 62/133 X |

Primary Examiner—Harry Tanner
Attorney, Agent, or Firm—Lane, Aitken & Kananen

[57] ABSTRACT

A variable-displacement rotary fluid compressor comprising first and second rotary compressor assemblies including respective rotor units rotatable about axes aligned with each other and first and second drive shafts respectively carrying and rotatable with the rotor units, each of the compressor assemblies having fluid inlet and outlet ports; a fluid inlet chamber communicating with the fluid inlet ports of the two compressor assemblies and a fluid outlet chamber communicating with the fluid outlet ports of the compressor assemblies; a first clutch assembly comprising a drive member which is rotatable about an axis aligned with the axes of rotation of the rotor units and which is to be driven by a drive source, a driven member rotatable with the first drive shaft and coupling means to couple the drive and driven members together when actuated; and a second clutch assembly comprising a driven member rotatable with the second drive shaft and coupling means to couple the respective driven members of the first and second clutch assemblies together when actuated. The compressor may be incorporated as a refrigerant compressor in an air conditioning system for, for example, automotive use.

4 Claims, 6 Drawing Figures

VARIABLE-DISPLACEMENT ROTARY FLUID COMPRESSOR AND AIR CONDITIONING SYSTEM USING THE COMPRESSOR

FIELD OF THE INVENTION

The present invention relates to a variable-displacement rotary fluid compressor and further to an air conditioning system using the rotary fluid compressor.

SUMMARY OF THE INVENTION

In accordance with one outstanding aspect of the present invention, there is provided a variable-displacement rotary fluid compressor comprising at least two rotary compressor assemblies consisting of first and second rotary compressor assemblies including respective rotor units rotatable about axes substantially aligned with each other and first and second drive shafts respectively carrying and rotatable with the rotor units, each of the compressor assemblies having a fluid inlet port and a fluid outlet port; members defining a fluid inlet chamber communicating with the respective fluid inlet ports of the first and second compressor assemblies and a fluid outlet chamber communicating with the respective fluid outlet ports of the first and second compressor assemblies; and at least two clutch assemblies consisting of first and second clutch assemblies, the first clutch assembly comprising a drive member which is rotatable about an axis substantially aligned with the axes of rotation of the rotor units and which is to be driven by a drive source, a driven member rotatable with the first drive shaft and releasable coupling means operative to couple the drive and driven members together when actuated, the second clutch assembly comprising a driven member rotatable with the second drive shaft and releasable coupling means operative to couple the respective driven members of the first and second clutch assemblies together when actuated.

In accordance with another outstanding aspect of the present invention, there is provided an air conditioning system for a vehicle having an internal combustion engine and an acceleration producing member, comprising, in addition to the above described rotary fluid compressor, a refrigerant evaporator core having refrigerant inlet and outlet ports, the refrigerant outlet port communicating with the fluid inlet chamber of the rotary fluid compressor; a refrigerant condenser core having refrigerant inlet and outlet ports, the refrigerant inlet port of the condenser core communicating with the fluid outlet chamber of the rotary fluid compressor; an expansion valve unit having a refrigerant inlet port communicating with the refrigerant outlet port of the condenser core and a refrigerant outlet port communicating with the refrigerant inlet port of the evaporator core; a conditioned-air temperature sensor which is positioned to be responsive to the temperature of air in the vehicle room and which is operative to detect the temperature of the air circulated through the evaporator core and to produce an output signal representative of the detected temperature of the conditioned air; a conditioned-air humidity sensor which is positioned to be responsive to the temperature of air in the vehicle room and which is operative to detect the humidity of the air circulated through the evaporator core and to produce an output signal representative of the detected humidity of the conditioned air; an engine-speed sensor which is provided in conjunction with the output shaft of the internal combustion engine and which is operative to detect the revolution speed of the engine output shaft and to produce an output signal representative of the detected revolution speed of the engine output shaft; an accelerator-position sensor which is provided in conjunction with an acceleration producing member and which is operative to detect the amount of displacement of the acceleration producing member and to produce an output signal representative of the detected amount of displacement of the acceleration producing member; and a compressor control circuit which is responsive to the signals respectively produced by the temperature sensor, humidity sensor, engine-speed sensor and accelerator-position sensor and which is operative to determine, on the basis of these signals, whether only one of the first and second clutch assemblies is to be coupled or both of the first and second rotary clutch assemblies are to be coupled.

BRIEF DESCRIPTION OF THE DRAWINGS

The features and advantages of a variable-displacement rotary fluid compressor and a vehicular air conditioning system according to the present invention will be clearly understood from the following description taken in conjunction with the accompanying drawings in which like reference numerals designate similar or corresponding assemblies, units, members and elements and in which.

DESCRIPTION OF THE PRIOR ART

Figure 1:
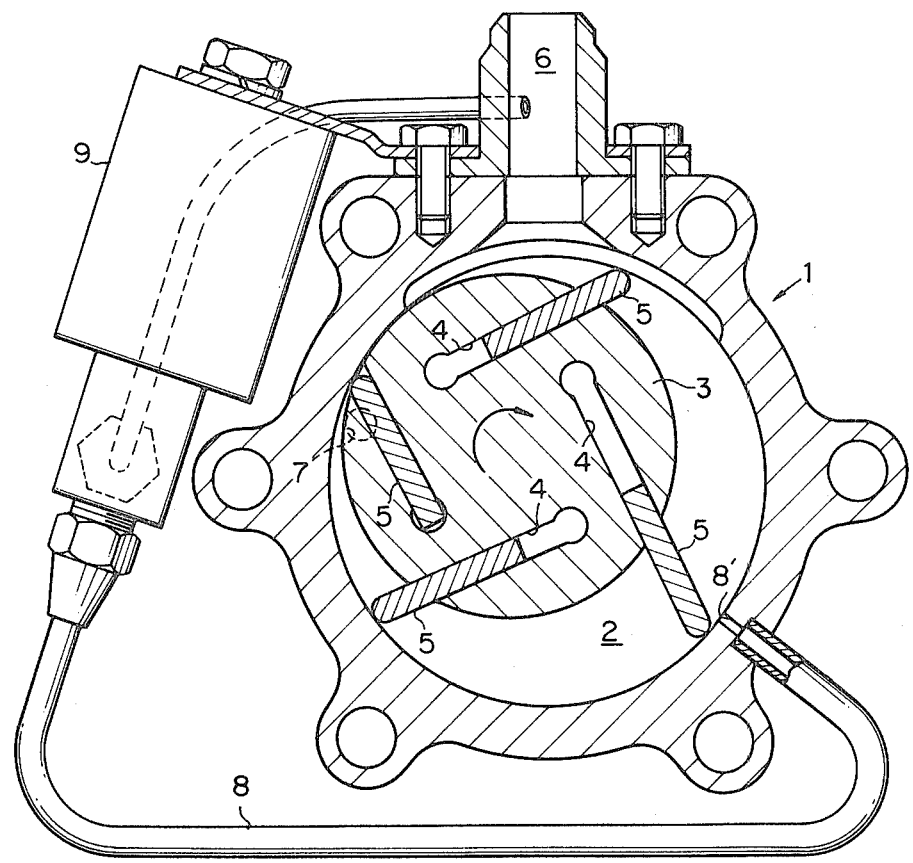
FIG. 1 is a cross sectional view showing a prior-art variable-displacement rotary fluid compressor.

Referring to FIG. 1 of the drawings, a known variable-displacement rotary fluid compressor is shown comprising a hollow compressor housing 1 formed with a cylindrical rotor chamber 2. A cylindrical rotor 3 having a center axis parallel with and offset from the center axis of the rotor chamber 2 is rotatable about the center axis of the rotor chamber 2. A compression chamber having a crescent-shaped cross section is thus defined between the rotor 3 and the compressor housing 1. The rotor 3 is formed with a plurality of guide slots 4 in which sliding vanes 5 are slidably fitted respectively. The vanes 5 are held at their outer edges with the inner peripheral surface of the compressor housing 1 by suitable biasing means such as fluid under pressure acting on the inner edges of the vanes. The crescent-shaped compression chamber as above described is thus divided into a plurality of variable-volume compartments by the vanes 5 projecting from the rotor 3. The compressor housing 1 is further formed with fluid inlet and outlet ports 6 and 7 open to the rotor chamber 2. The rotary fluid compressor herein shown is used in a vehicular air conditioning system so that the fluid inlet port 6 leads from a refrigerant evaporator core and the fluid outlet port 7 leads to a refrigerant condenser core, though not shown in the drawings. The prior-art rotary fluid compressor shown in FIG. 1 further comprises a fluid recirculation conduit 8 leading from the rotor chamber 2 to the fluid inlet port 7 through a solenoid-operated flow control valve unit 9 secured to the compressor housing 1. The recirculation conduit 8 is open to the rotor chamber 2 through a hole 8' formed in the compressor housing 1 and located between the fluid inlet port 6 and the fluid outlet port 7. The fluid in the compression chamber is thus recirculated through the conduit 8 and past the flow control valve unit 9 to the fluid inlet port 6 when the rotor 3 is on the compression stroke thereof. The flow control valve unit 9 is responsive to the output speed of the engine or the driving speed of the vehicle and is operative to control the flow rate of the fluid to be circulated through the recirculation conduit 8.

The prior-art rotary fluid compressor thus constructed has a drawback in that the compression chamber is open to the conduit through the hole 8' and thus adds to the effective volume of the compression chamber. The increased volume of the compression chamber results in reduction in the compression ratio available of the rotary fluid compressor and accordingly in reduction in the performance efficiency of the compressor. Because, furthermore, of the fact that fluid is recirculated from the compression chamber to the fluid inlet port 6 when the rotor 3 is on the compression stroke thereof, warmed fluid is injected into the fluid inlet port 6 and accordingly into the compression chamber during the suction stroke of the rotor 3 and gives rise to an increase in the fluid to be compressed. When the rotary fluid compressor is used in a refrigeration system or an air-conditioning for, for example, an automotive vehicle, the increase in the fluid fed into the rotor chamber 2 results in reduction of the performance efficiency of the cooling cycle of the system as a whole.

The present invention contemplates elimination of these drawbacks encountered in a prior-art variable-displacement rotary fluid compressor of the described nature and an air conditioning system using such a rotary fluid compressor.

DESCRIPTION OF THE PREFERRED EMBODIMENTS

Figure 2:
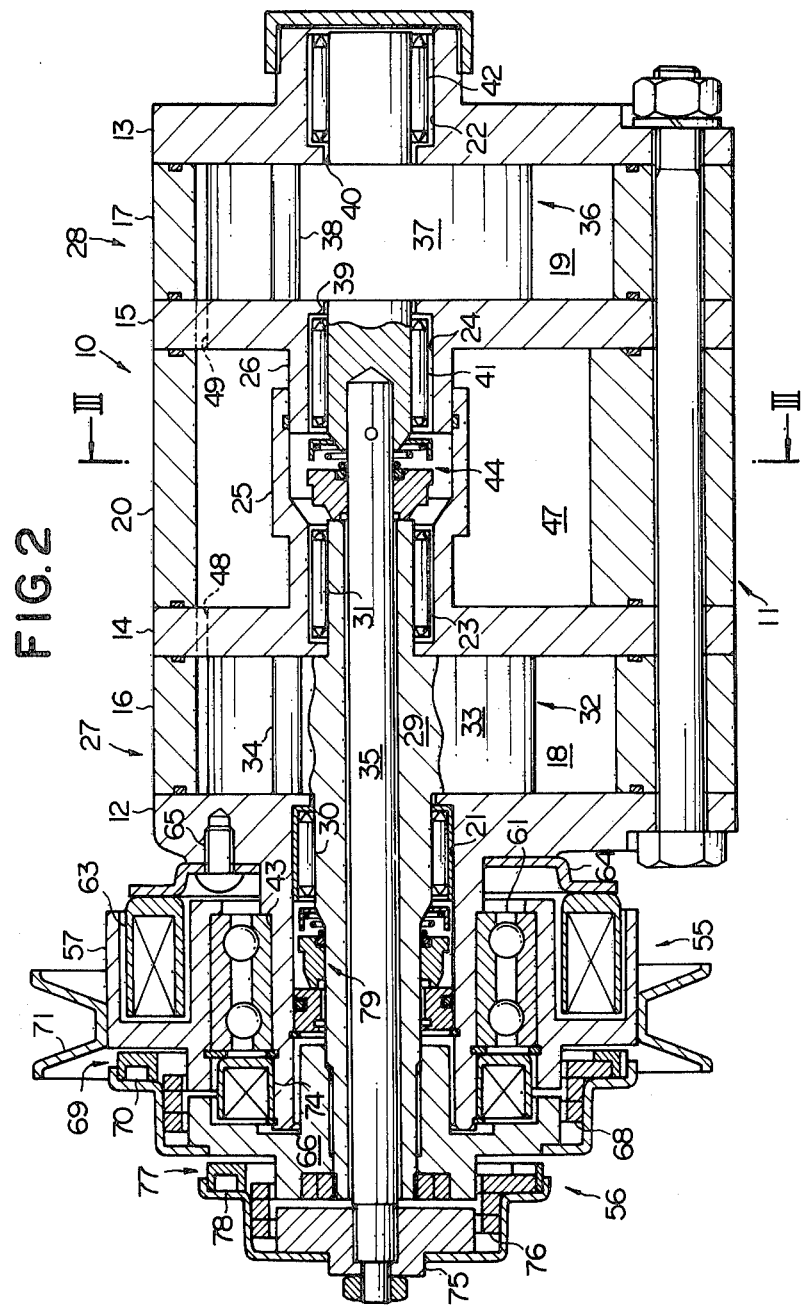
FIG. 2 is a longitudinal sectional view showing a first preferred embodiment of a variable-displacement rotary fluid compressor according to the present invention.

Referring to FIG. 2 of the drawings, a variable-displacement rotary fluid compressor embodying the present invention, as designated in its entirety by reference numeral 10, comprises a hollow, generally cylindrical compressor housing structure 11 composed of first and second end plates 12 and 13 and first and second partition plates 14 and 15. The first and second partition plates 14 and 15 are securely connected together by hollow cylindrical first and second rotor housing members 16 and 17, respectively. Thus, a cylindrical first rotor chamber 18 is defined by the first end plate 12, the first partition plate 14 and the first rotor housing member 16 and, likewise, a cylindrical second rotor chamber 19 is defined by the second end plate 13, the second partition plate 15 and the second rotor housing member 17. The partition plates 14 and 15 are securely connected together by a hollow cylindrical intermediate housing member 20. The end plates 12 and 13 and the partition plates 14 and 15 are formed with circular openings 21, 22, 23 and 24, respectively, having center axes aligned with one another axially of the compressor housing structure 11. The respective center axes of these circular openings 21, 22, 23 and 24 are offset from the respective center axes of the first and second rotor chambers 18 and 19. The first and second partition plates 14 and 15 have hollow, cylindrical axial extensions 25 and 26, respectively, axially projecting toward each other and connected together by forming therebetween a spigot joint as shown. The first end plate 12, first partition plate 14 and first rotor housing member 16 form part of a first rotary compressor assembly 27 and, likewise, the second end plate 13, second partition plate 15 and second rotor housing member 17 form part of a second rotary compressor assembly 28 of the rotary fluid compressor 10 embodying the present invention.

The first rotary compressor assembly 27 further comprises a hollow outer shaft 29 axially extending through the respective circular openings 21 and 23 and terminating in the axial extension 25 as shown. The hollow outer shaft 29 has an intermediate axial portion journaled in a bearing 30 received in the circular opening 21 in the first end plate 12 and an axial end portion journaled in a bearing 31 received in the circular opening 23 and is, thus, rotatable with respect to the compressor housing structure 11. The hollow outer shaft 29 has fixedly carried thereon in the first rotor chamber 18 a first rotor unit 32 consisting essentially of a cylindrical rotor 33 formed with a plurality of guide slots and a plurality of sliding vanes 34 slidably fitted in the individual guide slots as in the case of the prior art. The rotor 33 has a center axis which is coincident with the axis of rotation of the outer shaft 29 and which is accordingly offset from the center axis of the rotor chamber 18. A compression chamber having a crescent-shaped cross section is thus defined between the rotor 33 and the first rotor housing member 16. Though not shown in the drawings, the sliding vanes 34 are slidable through the guide slots, respectively, in the rotor 33 and are urged to be in contact at their outer edges with the inner peripheral surface of the first housing member 16 by suitable biasing means such as fluid under pressure acting on the inner edges of the vanes as in a known rotary fluid compressor described with reference to FIG. 1. The crescent-shaped compression chamber is divided into a plurality of variable-volume sections by the vanes 34 thus projecting from the rotor 33.

On the other hand, the second rotary compressor assembly 28 further comprises a inner shaft 35 axially extending through the hollow outer shaft 29 and terminating in the axial extension 26 of the second partition plate 15. The inner shaft 35 is rotatable in and with respect to the outer shaft 29 about an axis coincident with the axis of rotation of the shaft 29. The second rotary compressor assembly 28 further comprises a rotor unit 36 provided in the rotor chamber 19 and consisting essentially of a cylindrical rotor 37 formed with a plurality of guide slots and a plurality of sliding vanes 38 slidably fitted in the individual guide slots and urged to be in contact with the inner peripheral surface of the housing member by suitable biasing means as in the case of the rotor unit 32. The rotor 37 has a pair of trunnions 39 and 40 respectively projecting from the opposite end faces of the rotor 37. One trunnion 39 projects into the hollow axial extension 26 of the second partition plate 15 and is journaled in a bearing 41 received in the extension 26, and the other trunnion 40 projects into the circular opening 22 in the second end plate 13 and is journaled in a bearing 42 received in the opening 22. The trunnion 39 is securely connected to the inner shaft 35 so that the rotor 37 is rotatable about an axis coincident with an extension of the axis of rotation of the inner shaft 35 and which is accordingly offset from the center axis of the rotor chamber 19. A compression chamber having a crescent-shaped cross section is thus defined between the rotor 37 and the second rotor housing member 17. The crescent-shaped compression chamber is divided into a plurality of variable-volume compartments by the vanes 38 thus projecting from the rotor 33.

The first end plate 12 has a generally cylindrical axial extension 43 projecting away from the first partition plate 14. The outer and inner drive shafts 29 and 35 axially extend through this axial extension 43 and project outwardly therefrom. The open space formed between the respective axial extensions 25 and 26 of the first and second partition plates 14 and 15 is hermetically sealed from the gap between the outer and inner drive shafts 29 and 35 by means of a mechanical seal unit 44 coaxially mounted on the inner shaft 35.

Figure 3:
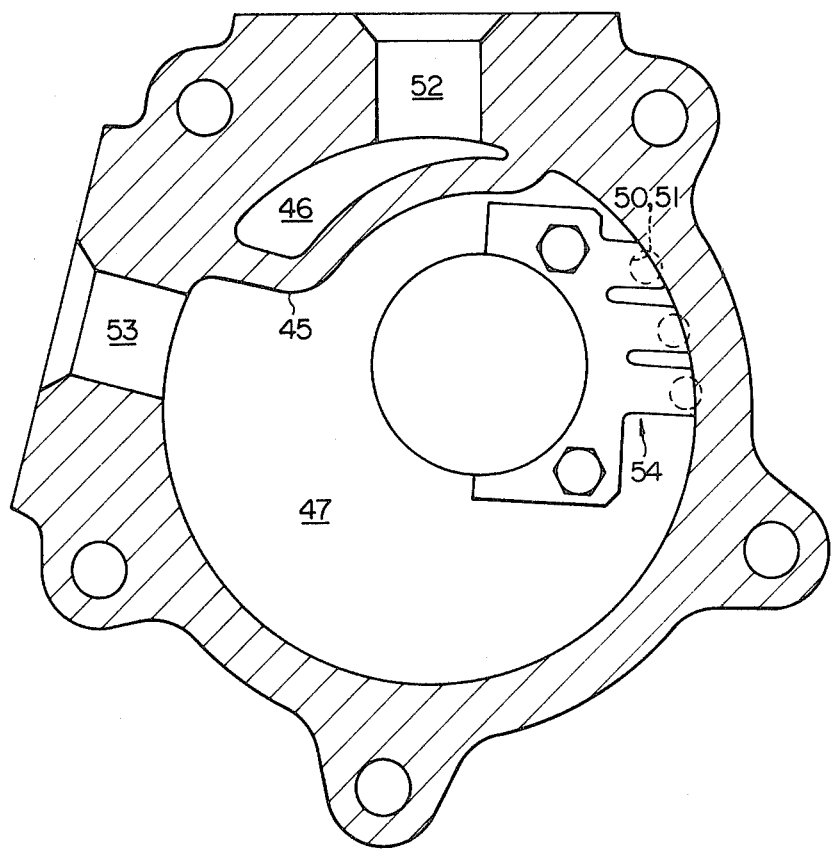
FIG. 3 is a cross sectional view taken on line III—III in FIG. 2.

As shown in FIG. 3, the intermediate housing member 20 of the compressor housing structure 11 has an internal partition wall portion 45 defining fluid inlet and outlet chambers 46 and 47 both elongated between the first and second partition plates 14 and 15 and separate from each other by the wall portion 45. The fluid inlet chamber 46 communicates with the rotor chamber 18 through a first fluid inlet port 48 formed in the first partition plate 14 and with the rotor chamber 19 through a second fluid inlet port 49 formed in the second partition plate 15, as indicated by dotted lines in FIG. 2. The first and second fluid inlet ports 48 and 49 are located so that fluid is allowed to enter the variable-volume compartment between adjacent two of the sliding vanes of the first and second rotor units 32 and 35 through the ports 48 and 49, respectively. Similarly, the fluid outlet chamber 47 communicates with the rotor chamber 18 through a first fluid outlet port 50 formed in the first partition plate 14 and with the rotor chamber 19 through a second fluid outlet port 51 formed in the second partition plate 15. The first and second fluid outlet ports 50 and 51 are located so that the fluid compressed between adjacent two of the sliding vanes of each of the first and second rotor units 32 and 35 is allowed to enter each of the ports 49 and 51 when each rotor unit is on the compression stroke thereof. The intermediate housing member 20 is further formed with suction and delivery ports 52 and 53 open to the above described first and second fluid chambers 46 and 47, respectively. These suction and delivery ports 52 and 53 may communicate with refrigerant evaporator and condenser cores, respectively, of an air conditioning system for, for example, automotive use, as will be described later. One-way check valves are provided to prevent fluid from flowing backwardly from the rotor chambers 18 and 19 to the fluid inlet chamber 46 through the first and second fluid inlet ports 48 and 49, respectively, and, likewise, one-way check valves are provided to prevent fluid from flowing backwardly from the fluid outlet chamber 47 to the rotor chambers 18 and 19 through the first and second fluid outlet ports 50 and 51, respectively. In FIG. 3, only one of such check valves is shown at 54, which check valve is adapted to prevent fluid from flowing backwardly from the fluid outlet chamber 47 to the rotor chamber 18 through the first fluid outlet port 50.

Turning back to FIG. 2, the rotary fluid compressor 10 further comprises first and second magnetic clutch assemblies 55 and 56 adapted to transmit driving power selectively to the hollow outer shaft 29 alone or to both of the hollow outer shaft 29 and the inner shaft 35. The first magnetic clutch assembly 55 comprises a drive member 57 rotatably supported on the axial extension 43 of the end plate 12 by means of a bearing 61. The drive member 57 is formed with an annular concavity which is axially open toward the first end plate 12 of the compressor housing structure 11 and in which an annular solenoid coil unit 63 is positioned in such a manner as to permit the drive member 57 to rotate with respect to the coil unit 63. The solenoid coil unit 63 is carried by a coil support plate 64 securely attached to the first end plate 12 by suitable fastening means such as screws one of which is indicated at 65. The first magnetic clutch assembly 55 further comprises a driven member 66 securely mounted on an outer end portion of the hollow outer shaft 29 and axially aligned with and slightly spaced apart from the drive member 57, the drive member 57 and the driven member 66 being surrounded, each partially, by a helical compression spring 68 having rectangular cross section. The drive member 57 is further coaxially surrounded by an annular magnet unit 69 including an annular permanent magnet 70 having opposite polarities at the opposite end faces thereof. The magnet unit 69 is positioned in a face-to-face relationship to the outer end face of the drive member 57 in such a manner as to permit the drive member 57 to rotate with respect to the magnet unit 69. The helical compression spring 68 is anchored at one end to the outer wall of the driven member 66 and at the other end to the magnet unit 69. The spring 68 is biased to radially expand about the center axis thereof and to urge the magnet unit 69 to stay in an axial position spaced apart from the drive member 57 and is adapted to radially contract when forced to twist in the direction of rotation of the drive member 57 about the axis of rotation of the hollow outer shaft 29. The coil unit 63, compression spring 68 and magnet unit 69 constitute in combination releasable coupling means of the first magnetic clutch assembly 55. A circumferentially grooved pulley 71 is securely attached to the outer wall of the drive member 57. The pulley 71 forms part of a belt and pulley arrangement to transmit driving power from a suitable drive source to the drive member 57 as will be described in more detail.

When the solenoid coil unit 63 of the first magnetic clutch assembly 55 remains de-energized, the spring 68 is allowed to stay in a radially expanded state around the drive member 57 and the outer wall of the driven member 66 and maintains the magnet unit 69 in the axial position spaced apart from the drive member 57. The magnet unit 69 being thus disengaged from the drive member 57, driving power carried through the pulley 71 to the drive member 57 is not transmitted to the magnet unit 69 so that the drive member 57 rotates with respect to the driven member 66 which is held at a standstill. When the solenoid coil unit 63 is energized, the magnet unit 69 is forced to axially move into contact with the outer end face of the drive member 57 and is thus urged to turn together with the drive member 57 being driven for rotation by the pulley 71. Thus, the magnet unit 69 forces the compression spring 68 to twist about the center axis thereof and thereby causes the spring 68 to radially contract onto the drive member 57 and the outer wall of the driven member 66. The drive member 57 is now permitted to engage the driven member 66 through the magnet unit 69 and the contracted compression spring 68 so that the rotation of the drive member 57 is transmitted through the magnet unit 69 and the spring 68 to the driven member 66 and further through the driven member 66 to the hollow outer shaft 29.

The second magnetic clutch assembly 56 comprises an annular solenoid coil unit 74 positioned between the drive member 57 and the driven member 66 and securely mounted on the axial extension 43, the solenoid coil unit 74 being slightly spaced apart from the driven member 66 for permitting the driven member 66 to rotate with respect to the coil unit 74. The second magnetic clutch assembly 56 further comprises a driven member 75 securely mounted on an outer end portion of the inner shaft 35 and axially aligned with and slightly spaced apart from the driven member 66. The driven member 66 and the driven member 75 are coaxially surrounded, each partially, by a helical compression spring 76 of a rectangular cross section. The driven member 66 is further coaxially surrounded by an annular magnet unit 77 including an annular permanent magnet 78 having opposite polarities at the opposite end faces thereof. The magnet unit 77 is positioned in a face-to-face relationship to the solenoid coil unit 74 across the driven member 66 and spaced apart from the driven member 66 in such a manner as to permit the driven member 66 to rotate with respect to the magnet unit 77. The helical compression spring 76 is anchored at one end to the outer peripheral wall portion of the driven member 74 and at the other end to the magnet unit 77. The spring 76 is also biased to radially expand about the center axis thereof and to urge the magnet unit 77 to stay in an axial position spaced apart from the driven member 66 and is adapted to radially contract when forced to twist in the direction of rotation of the drive member 57 about the axis of rotation of the hollow outer shaft 29. The coil unit 74, compression spring 76 and magnet unit 77 constitute in combination releasable coupling means of the second magnetic clutch assembly 56. An open space formed between the driven member 66 and the first end plate 12 of the compressor housing structure 11 is hermetically sealed from the outside of the apparatus by means of a mechanical seal unit 79 coaxially mounted on the hollow outer shaft 29.

When the solenoid coil unit 74 of the second magnetic clutch assembly 56 remains de-energized, the spring 76 is allowed to stay in a radially expanded state around the driven members 66 and outer peripheral wall portion of the driven member 75 and maintains the magnet unit 77 in the axial position spaced apart from the driven member 66. If the drive member 57 is driven for rotation by the pulley 71 with the magnet unit 77 thus disengaged from the driven member 66, the driving power carried through the drive member 57 to the driven member 66 of the first magnetic clutch assembly 55 is not transmitted to the magnet unit 77 so that the driven member 75 is held at a standstill. When the solenoid coil unit 74 is energized, the magnet unit 77 is forced to axially move into contact with the outer end face of the driven member 66 and is thus urged to turn together with the driven member 66. Thus, the magnet unit 77 forces the compression spring 76 to twist about the center axis thereof and thereby causes the spring 76 to radially contract onto the driven member 66 and the cylindrical outer peripheral wall portion of the driven member 75. The driven member 66 is now permitted to engage the driven member 75 through the magnet unit 77 and the contracted compression spring 76 so that the rotation of the driven member 66 is transmitted through the magnet unit 77 and the spring 76 to the driven member 75 and further through the driven member 75 to the inner shaft 35.

Figure 4:
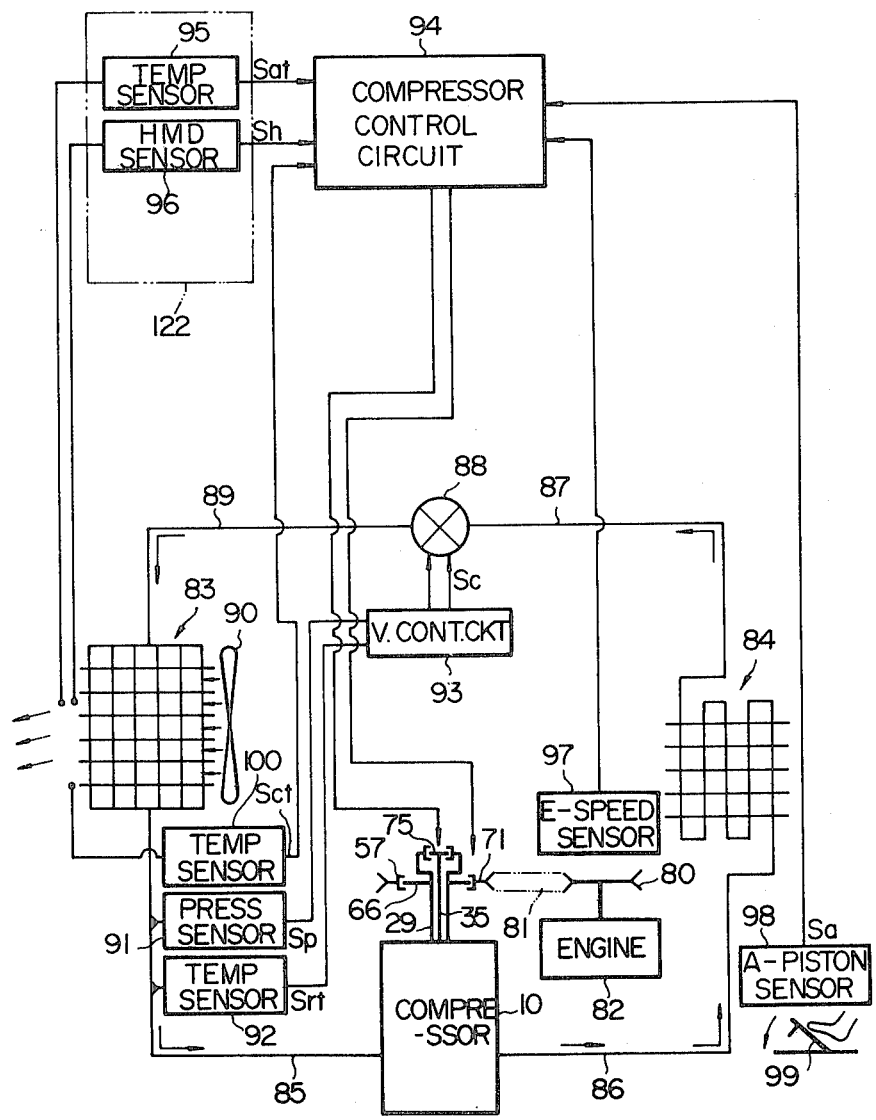
FIG. 4 is a schematic view showing an embodiment of an air conditioning system using a variable-displacement rotary fluid compressor embodying the present invention.

FIG. 4 of the drawings shows a vehicular air conditioning system using the rotary fluid compressor hereinbefore described with reference to FIGS. 2 and 3. In the arrangement shown in FIG. 4, the pulley 71 on the drive member 57 of the first magnetic clutch assembly 55 forms part of a belt and pulley arrangement which further comprises a drive pulley 80 and an endless belt 81 passed between the drive and driven pulleys 80 and 71. The drive pulley 80 is driven by the output shaft of an internal combustion engine 82.

The air conditioning system shown in FIG. 4 is constituted, in effect, by a heat pump which comprises, in addition to the rotary fluid compressor 10, refrigerant evaporator and condenser cores 83 and 84 each having refrigerant inlet and outlet ports. The refrigerant inlet port of the evaporator core 83 communicates through a refrigerant passageway 85 to the suction port 52 (FIG. 2) of the rotary fluid compressor 10 and the delivery port 53 of the compressor 10 communicates through a refrigerant passageway 86 with the refrigerant inlet port of the condenser core 84. The refrigerant outlet port of the condenser core 84 communicates through a refrigerant passageway 87, by way of a solenoid-operated expansion valve unit 88 and further through a refrigerant passageway 89 with the refrigerant inlet port of the evaporator core 83. The low-pressure refrigerant discharged in a vapor state from the evaporator core 83 is passed through the passageway 85 to the suction port 52 of the rotary fluid compressor 10 and is compressed by the first rotary compressor assembly 27 or both of the first and second rotary compressor assemblies 27 and 28 (FIG. 2). The high-pressure refrigerant gas thus delivered from the delivery port 53 of the compressor 10 is circulated through the passageway 86 to the refrigerant inlet port of the condenser core 84 and is condensed to a liquid state therein, giving up the latent heat of condensation to the air contacting the heat-exchange surfaces of the condenser core 84. From the coil unit, the low-temperature liquid refrigerant is passed through the passageway 87 to the expansion valve unit 88 and is rendered into an atomized state causing further reduction of the temperature by adiabatic expansion of the refrigerant. Past the expansion valve unit 88, the refrigerant in the cold, atomized state is circulated through the passageway 89 to the evaporator core 83 and is changed into a gas absorbing the heat of evaporation from the air contacting the heat-exchange surfaces of the evaporator core 83. The air thus cooled by the evaporator core 83 may be forced to flow away from the evaporator core 83 by means of a cooling fan 90 provided in conjunction with the evaporator core 83 as shown. From the evaporator core 83, the high-temperature refrigerant gas returns to the suction port 52 of the rotary fluid compressor 10 so as to repeat the cycle. The detailed construction of each of the refrigerant evaporator and condenser cores 83 and 84 and the expansion valve unit 88 as above described is well known in the art and is not herein shown and described.

The solenoid-operated expansion valve unit 88 is controlled to provide a flow rate dependent on the pressure and temperature of the refrigerant gas being supplied from the evaporator core 83 to the compressor 10. For this purpose, a refrigerant pressure sensor 91 and a refrigerant temperature sensor 92 are provided in conjunction with the refrigerant passageway 85 leading from the outlet port of the evaporator core 83 to the suction port 52 of the compressor 10. The refrigerant pressure and temperature sensors 91 and 92 are thus adapted to detect the pressure and temperature, respectively, of the low-pressure, high-temperature refrigerant gas being circulated through the passageway 85 and to produce output signals $Sp$ and $Srt$, respectively, representative of the detected pressure and temperature of the refrigerant gas in the passageway 85. The signals $Sp$ and $Srt$ are fed to a valve control circuit 93 adapted to determine a flow rate of refrigerant adequate for the pressure and temperature respectively represented by the signals $Sp$ and $Srt$ and to produce a control signal $Sc$ representative of the flow rate thus determined. The control signal $Sc$ is fed to the solenoid coil (not shown) of the expansion valve unit 88 so as to control the valve unit 88 to permit the refrigerant to flow therethrough at the flow rate represented by the signal $Sc$.

On the other hand, the coil unit 63 of the first magnetic clutch assembly 55 and the coil unit 74 of the second magnetic clutch assembly 56 of the rotary fluid compressor (FIG. 2) are energized and de-energized under the control of signals supplied from a compressor control circuit 94. The compressor control circuit 94 has input terminals respectively connected to a conditioned-air temperature sensor 95, a conditioned-air humidity sensor 96, an engine-speed sensor 97 and an accelerator-position sensor 98. The temperature sensor 95 is positioned to be responsive to the temperature of air in the vehicle room 122 and is operative to detect the temperature of the air circulated through the evaporator core 83 and to produce an output signal $Sat$ representative of the detected temperature of the conditioned air. The humidity sensor 96 is also positioned to be responsive to the humidity of air in the vehicle room 122 and is operative to detect the humidity of the air circulated through the evaporator core 83 and to produce an output signal $Sh$ representative of the detected humidity of the conditioned air. The engine-speed sensor 97 is provided in conjunction with the output shaft of the internal combustion engine 82 or the drive pulley 80 provided in association with the engine output shaft and is operative to detect the revolution speed of the engine output shaft and to produce an output signal $Sn$ representative of the detected revolution speed of the engine output shaft. On the other hand, the accelerator-position sensor 98 is provided with the accelerator pedal 99 to control the angular position of the throttle valve (not shown) of the engine and is thus operative to detect the amount of displacement of the accelerator pedal 99 and to produce an output signal $Sa$ representative of the detected amount of displacement of the accelerator pedal 99. The signals $Sat$, $Sh$, $Sn$ and $Sa$ are fed to the input terminals of the compressor control circuit 94, which is operative to determine, on the basis of the input signals $Sat$, $Sh$, $Sn$ and $Sa$, whether only the first rotary compressor assembly 27 is to be put into operation or both of the first and second rotary compressor assemblies 27 and 28 are to be put into operation. An exciting current is thus fed to the coil unit 63 of the first magnetic clutch assembly 55 or to each of the coil units 63 and 74 of the first and second magnetic clutch assemblies 55 and 56.

If desired, the air conditioning system shown in FIG. 4 may further comprise another temperature sensor 100 provided on the immediately leeward side of the evaporator core 83 and operative to detect the temperature of the air cooled by the evaporator core 83 and to produce an output signal $Sct$ representative of the detected temperature of the cooled air. The signal $Sct$ is also fed to the compressor control circuit 94, which interrupts supply of an exciting current to the coil unit 63 of the first magnetic clutch assembly 55 when the temperature of air represented by the signal $Sct$ is lower than a predetermined value. The temperature sensor 100 is, thus, adapted to prevent deposit of frost on the heat-exchange surfaces of the evaporator core 83 by making both of the first and second rotary compressor assemblies 27 and 28 inoperative when the temperature of the air cooled by the evaporator core 83 becomes lower than the predetermined value.

Description will be hereinafter made with reference to FIGS. 2 to 4 regarding the operation of the vehicular air conditioning system thus constructed and arranged and including the variable-displacement rotary fluid compressor 10 shown in FIGS. 2 and 3.

When, now, the internal combustion engine 82 is in operation, the engine-speed sensor 97 detects the revolution speed of the engine output shaft and delivers to the compressor control circuit 94 a signal $Sn$ representative of the detected engine output speed. An ordinary air conditioning system for automotive use is designed to have the refrigerant circulated at an optimum rate therethrough and accordingly operates under optimum conditions when the engine is operating at about 2000 rpm, as well known in the art. When the engine is operating at a speed higher than about 2000 rpm, the cooling capacity of the air conditioning system is thus excessive for the performance of the engine and the power consumption rate of the fluid compressor increases at an abruptly increasing rate, causing the engine to be subjected to a load approximately proportional to the power consumption rate of the compressor. When the output speed of the engine as represented by the signal $Sn$ is higher than a predetermined value of, for example, 2000 rpm, the compressor control circuit 94 supplies an exciting current to the coil unit 63 of the first magnetic clutch assembly 55 alone (FIG. 2). The coil unit 63 of the first magnetic clutch assembly 55 being thus energized, the magnet unit 69 of the clutch assembly 55 is forced to axially move into contact with the drive member 57 and is urged to turn together with the drive member 57 being driven for rotation from the engine 82 through the drive pulley 80, endless belt 81 and driven pulley 71. Thus, the magnet unit 69 forces the compression spring 68 to twist about the center axis thereof and thereby causes the spring 68 to radially contract onto the drive member 57 and the driven member 66. The drive member 57 is permitted to engage the driven member 66 through the magnet unit 69 and the contracted compression spring 68 so that the rotation of the drive member 57 is transmitted through the magnet unit 69 and the spring 68 to the driven member 66 and further through the driven member 66 to the hollow outer shaft 29. The rotor unit 32 of the first rotary compressor assembly 27 is thus driven for rotation in the rotor chamber 18 of the compressor assembly 27 and is operative to compress the refrigerant gas discharged from the evaporator core 83 (FIG. 3) to the compressor 10 through the refrigerant passageway 85 and admitted into the rotor chamber 18 by way of the suction port 52 (FIG. 3), fluid inlet chamber 46 and first fluid inlet port 48 (FIG. 2) in the compressor housing structure 11. The refrigerant gas thus compressed in the rotor unit 32 is delivered from the rotor chamber 18 to the condenser core 84 (FIG. 4) by way of the first fluid outlet port 50 (FIG. 3), fluid outlet chamber 47 and delivery port 53 in the compressor housing structure 11 and through the refrigerant passageway 86 FIG. 4). On the other hand, the coil unit 74 of the second magnetic clutch assembly 56 is maintained de-energized so that the spring 76 of the clutch assembly 55 is allowed to stay in a radially expanded state around the driven member 66 and the driven member 75 and maintains the magnet unit 77 in the axial position spaced apart from the driven member 66. The driving power carried through the drive member 57 to the driven member 66 of the first magnetic clutch assembly 55 as above described is therefore not transmitted to the magnet unit 77 so that the driven member 75 and accordingly the inner shaft 35 are held at rest.

When, on the other hand, the accelerator pedal 99 (FIG. 4) is depressed to accelerate the vehicle, the accelerator-position sensor 98 produces an output signal Sn representative of the detected amount of displacement of the accelerator pedal 99 thus depressed. If the amount of displacement of the accelerator pedal 99 as represented by the signal Sn is larger than a predetermined value, the compressor control circuit 94 supplies an exciting current to the coil unit 63 of the first magnetic clutch assembly 55 alone (FIG. 2) and as a consequence the clutch assembly 55 is coupled as in the above described conditions of the vehicle. The rotor unit 32 of the first rotary compressor assembly 27 is thus driven for rotation in the rotor chamber 18 and is operative to compress the refrigerant gas discharged from the evaporator core 83 (FIG. 3) to the compressor 10, while the second magnetic clutch assembly 56 is held uncoupled with the driven member 75 of the second magnetic clutch assembly 56 disengaged from the driven member 66 and accordingly the inner shaft 35 of the second rotary compressor assembly 28 is held at rest with the second rotary compressor assembly 28 maintained inoperative.

When, furthermore, the temperature of the air in the vehicle room 122 as detected by the temperature sensor 95 and/or the humidity of the air in the vehicle room 122 as detected by the humidity sensor 96 are higher than predetermined values, the sensors 95 and 96 deliver to the compressor control circuit 94 output signals Sat and Sh representative of such temperature and humidity, respectively. In response to these signals Sat and Sh, the compressor control circuit 94 supplies an exciting current to each of the solenoid coil units 63 and 74 of the first and second magnetic clutch assemblies 55 and 56, respectively. The coil unit 63 being thus energized, the rotor unit 32 of the first rotary compressor assembly 27 is driven for rotation in the rotor chamber 18 and is operative to compress the refrigerant gas discharged from the evaporator core 83 (FIG. 3) to the compressor 10 as above described. The solenoid coil unit 74 being also energized, the magnet unit 77 of the clutch assembly 56 is forced to axially move into contact with the outer end face of the driven member 66 and is thus urged to turn together with the driven member 66. Thus, the magnet unit 77 forces the compression spring 76 to twist about the center axis thereof and thereby causes the spring 76 to radially contract onto the driven member 66 and the cylindrical outer peripheral wall portion of the driven member 75. The driven member 66 is permitted to engage the driven member 75 of the second magnetic clutch assembly 56 through the magnet unit 77 and the contracted compression spring 76 so that the rotation of the driven member 66 is transmitted through the magnet unit 77 and the spring 76 to the driven member 75 and further through the driven member 75 to the inner shaft 35. The rotor unit 36 of the second rotary compressor assembly 28 is thus also driven for rotation in the rotor chamber 19 of the compressor assembly 28 and is operative to compress the refrigerant gas admitted into the rotor chamber 19. The refrigerant gas thus compressed in the rotor unit 36 is delivered from the rotor chamber 19 to the condenser core 84 (FIG. 4) through the refrigerant passageway 86 (FIG. 4).

Figure 5:
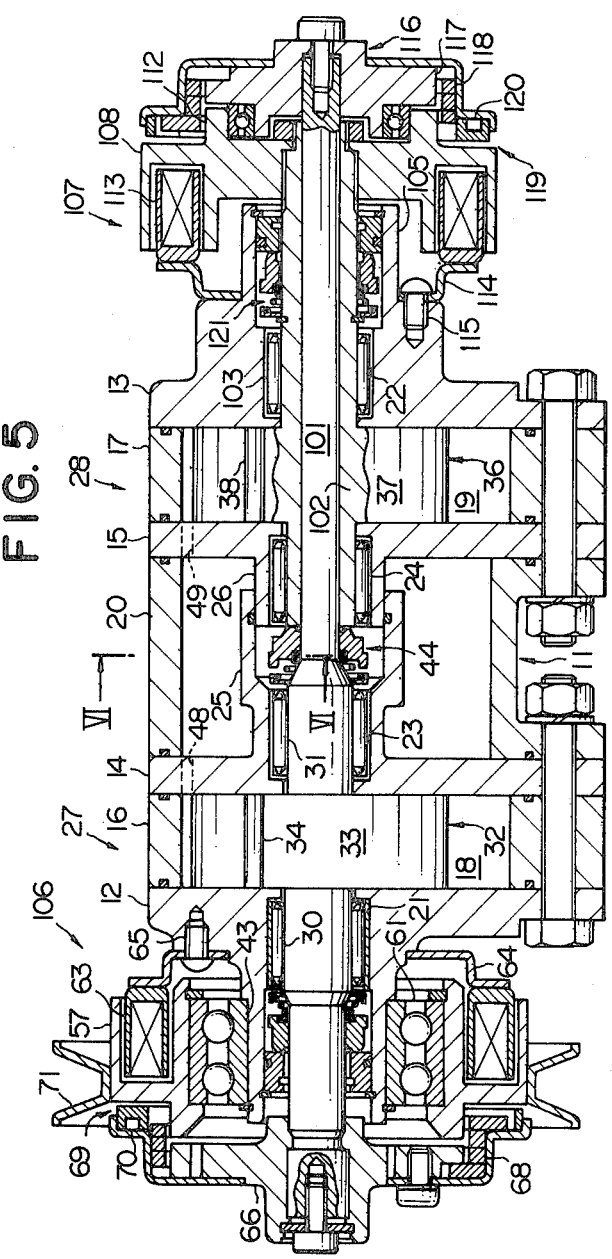
FIG. 5 is a view similar to FIG. 2 but shows a second preferred embodiment of a variable-displacement rotary fluid compressor according to the present invention.
Figure 6:
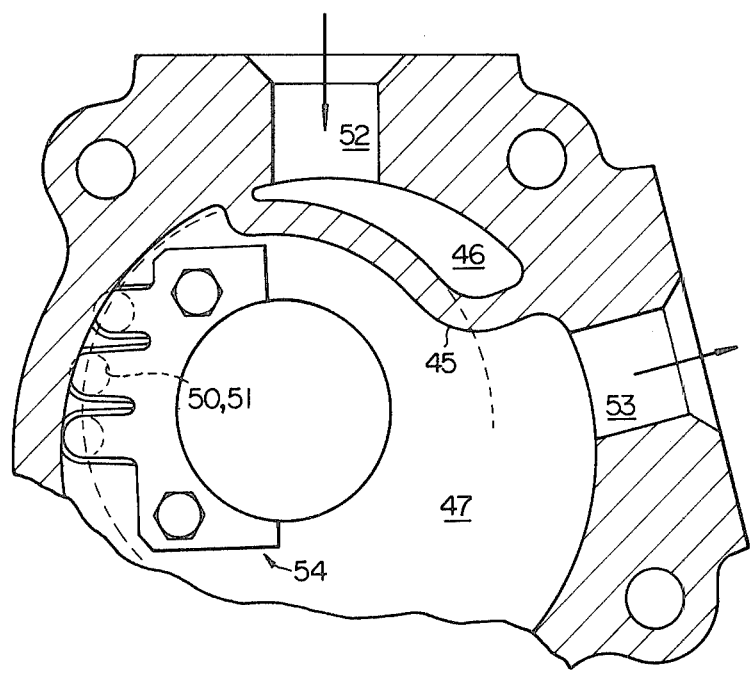
FIG. 6 is a cross sectional view taken on line VI—VI in FIG. 5.

FIGS. 5 and 6 show another preferred embodiment of a variable-displacement rotary fluid compressor according to the present invention. The rotary fluid compressor herein shown is a modification of the embodiment described with reference to FIGS. 2 and 3 and comprises a compressor housing structure 11 which is similar in construction to its counterpart in the embodiment of FIGS. 2 and 3.

The first rotary compressor assembly 27 further comprises a first shaft 101 extending through the openings 21 and 23 in the first end plate 12 and the first partition plate 14 and further through the openings 22 and 24 in the second end plate 13 and second partition plate 15. The first shaft 101 has axial portions respectively journaled in a bearing 30 received in the opening 21 and a bearing 31 received in the opening 23 and is rotatable with respect to the compressor housing structure 11. The first shaft 101 has fixedly carried thereon in the first rotor chamber 18 a first rotor unit 32 including a cylindrical rotor 33 and a plurality of sliding vanes 34. The rotor 33 has a center axis coincident with the axis of rotation of the first shaft 101 and offset from the center axis of the rotor chamber 18. On the other hand, the second rotary compressor assembly 28 further comprises a hollow second shaft 102 extending through the openings 22 and 24 in the second end plate 13 and second partition plate 15 and terminating in the extension 26. The first shaft 101 extends through this hollow second shaft 102 and projects outwardly from the second shaft 102 in the neighborhood of the second end plate 13. The second shaft 102 is thus rotatable on and with respect to the first shaft 101 about an axis coincident with the axis of rotation of the shaft 102. The second shaft 102 has fixedly carried thereon in the second rotor chamber 19 a second rotor unit 36 including a cylindrical rotor 37 and a plurality of sliding vanes 38. The rotor 33 has a center axis aligned with the center axis of the rotor unit 32 and offset from the center axis of the rotor chamber 19. The second shaft 102 has an axial portion journaled in a bearing 103 so that the rotor 37 is rotatable about the center axis of the hollow second shaft 102. The open space formed between the respective axial extensions 25 and 26 is sealed from the gap between the drive shafts 101 and 102 by means of a mechanical seal unit 44 coaxially mounted on the second shaft 102. The end plate 13 has generally cylindrical axial extension 105 projecting away from the second partition plate 15. The drive shafts 101 and 102 extend through the extension 105 and project outwardly therefrom.

As shown in FIG. 6, the intermediate housing member 20 of the compressor housing structure 11 has an internal partition wall portion 45 defining fluid inlet and outlet chambers 46 and 47 together with suction and delivery port 52 and 53 as in the compressor described with reference to FIGS. 2 and 3.

Turning back to FIG. 5, the second embodiment of a rotary fluid compressor according to the present invention further comprises first and second magnetic clutch assemblies 106 and 107 adapted to transmit driving power selectively to the first shaft 101 alone or to both of the first shaft 101 and the hollow second shaft 102. The first magnetic clutch assembly 101 is similar in construction to the first magnetic clutch assembly 55 so that the members consisting the first magnetic clutch assembly 101 are denoted by reference numerals designating their respective counterparts of the magnetic clutch assembly 55. The second magnetic clutch assembly 107 is *per se* constructed and arranged similarly to the above described first magnetic clutch assembly 101 and accordingly to the magnetic clutch assembly 55. Thus, the second magnetic clutch assembly 107 comprises a driven member 108 positioned coaxially around the extension 105 and having a cylindrical axial extension 112 projecting opposite to the second end plate 13. The driven member 108 is formed with an annular concavity which is axially open toward the second end plate 13 and in which an annular coil unit 113 is positioned in such a manner as to permit the driven member 108 to rotate with respect to the coil unit 113. The coil unit 113 is carried by a coil support plate 114 securely attached to the second end plate 13 by, for example, a screw 115. The second magnetic clutch assembly 107 further comprises a drive member 116 securely mounted on an outer end portion of the second shaft 102 and having an annular outer wall portion 117 aligned with and slightly spaced apart from the extension 112 of the driven member 108. The extension 112 of the driven member 108 and the outer wall portion 117 of the drive member 116 are coaxially surrounded, each partially, by a helical compression spring 118. The extension 112 of the driven member 108 is further coaxially surrounded by an annular magnet unit 119 including a permanent magnet 120. The magnet unit 119 is positioned in a face-to-face relationship to the driven member 108 and surrounds the extension 112 of the driven member 108 in such a manner as to permit the driven member 108 to rotate with respect to the magnet unit 119. The spring 118 is anchored at one end to the annular outer wall portion 117 of the drive member 116 and at the other end to the magnet unit 119. The spring 118 is biased to radially expand about the center axis thereof and to urge the magnet unit 119 to stay in an axial position spaced apart from the driven member 108 and is adapted to radially contract when forced to twist in the direction of rotation of the drive member 116. The coil unit 113, spring 118 and magnet unit 119 constitute releasable coupling means of the second magnetic clutch assembly 107. An open space formed between the driven member 108 and the second end plate 13 is sealed from the outside of the apparatus by means of a mechanical seal unit 121 mounted on the second shaft 102.

Each of the first and second magnetic clutch assemblies 106 and 107 thus constructed and arranged is operative essentially similarly to the first magnetic clutch assembly 55 in the embodiment of FIGS. 2 and 3 except in that rotation of driven member 66 of the first magnetic clutch assembly 101 which is transmitted to the driven member 108 of the second magnetic clutch assembly 107 through the first shaft 101 when the first magnetic clutch assembly 101 is in a coupled condition.

The modes of operation of the rotary fluid compressor hereinbefore described will thus be readily understood on the analogy of the description made in connection with the modes of operation of the embodiment of FIGS. 2 and 3.

What is claimed is:

1. A variable-displacement rotary fluid compressor comprising at least two rotary compressor assemblies consisting of first and second rotary compressor assemblies including respective rotor units rotatable about axes substantially aligned with each other and first and second drive shafts respectively carrying and rotatable with said rotor units, wherein said first drive shaft is a hollow shaft and said second drive shaft extends in part through the hollow shaft, each of the compressor assemblies having a fluid inlet port and a fluid outlet port;

members defining a fluid inlet chamber communicating with the respective fluid inlet ports of the first and second compressor assemblies and a fluid outlet chamber communicating with the respective fluid outlet ports of the first and second compressor assemblies; and at least two clutch assemblies consisting of first and second clutch assemblies, the first clutch assembly comprising a drive member which is rotatable about an axis substantially aligned with the axes of rotation of said rotor units and which is to be driven by a drive source, a driven member rotatable with and coaxially secured to said first drive shaft and releasable coupling means operative to couple the drive and driven members together when actuated, the second clutch assembly comprising a driven member rotatable with said second drive shaft and releasable coupling means directly engageable with the driven member of the first clutch assembly and operative to couple the respective driven members of the first and second clutch assemblies together when actuated, and wherein the coupling means of said first clutch assembly comprises an annular solenoid coil unit which is held stationary with respect to said members and which is positioned in coaxially surrounding relationship to said first and second drive shafts, a helical compression spring coaxially surrounding axial portions of the drive and driven members of the first clutch assembly and adapted to radially contract onto said portions of the drive and driven members when twisted about the center axis thereof, and an annular permanent magnet unit axially aligned with said coil unit across said drive member and axially movable into and out of contact with the drive member, said compression spring being anchored at one end to said driven member of the first clutch assembly and at the other end to said magnet unit and urging the magnet unit axially away from the drive member, the coupling means of said second clutch assembly comprising an annular solenoid coil unit which is held stationary with respect to said members and which is positioned in coaxially surrounding axial portions of the respective driven members of the first and second clutch assemblies and adapted to radially contract onto said portions of the driven members when twisted about the center axis thereof, and an annular permanent magnet unit axially aligned with the coil unit of the second clutch assembly across said drive member and axially movable into and out of contact with the driven member of the first clutch assembly, the compression spring of the second clutch assembly being anchored at one end to said driven member of the second clutch assembly and at the other end to said magnet unit of the second clutch assembly and urging the magnet unit of the second clutch assembly axially away from the driven member of the first clutch assembly.

2. A variable-displacement rotary fluid compressor comprising at least two rotary compressor assemblies consisting of first and second rotary compressor assemblies including respective rotor units rotatable about axes substantially aligned with each other and first and second drive shafts respectively carrying and rotatable with said rotor units, wherein said second drive shaft is a hollow shaft and said first drive shaft extends in part through the hollow shaft, each of the compressor assemblies having a fluid inlet port and a fluid outlet port;

members defining a fluid inlet chamber communicating with the respective fluid inlet ports of the first and second compressor assemblies and a fluid outlet chamber communicating with the respective fluid outlet ports of the first and second compressor assemblies; and at least two clutch assemblies consisting of first and second clutch assemblies, the first clutch assembly comprising a drive member which is rotatable about an axis substantially aligned with the axes of rotation of said rotor units and which is to be driven by a drive source, a driven member axially aligned with and rotatably secured to said first drive shaft and releasable coupling means operative to couple the drive and driven members together when actuated, the second clutch assembly comprising a driven member rotatable with said second drive shaft and releasable coupling means engageable with the driven member of the first clutch assembly through the first drive shaft and operative to couple the respective driven members of the first and second clutch assemblies together when actuated, and wherein the coupling means of said first clutch assembly comprises an annular solenoid coil unit which is held stationary with respect to said members and which is positioned in coaxially surrounding relationship to said first drive shaft, a helical compression spring coaxially surrounding axial portions of the drive and driven members of the first clutch assembly and adapted to radially contract onto said portions of the drive and driven members when twisted about the center axis thereof, and an annular permanent magnet unit axially aligned with said coil unit across said drive member and axially movable into and out of contact with the drive member, said compression spring being anchored at one end to said driven member of the first clutch assembly and at the other to said magnet unit and urging the magnet unit axially away from the drive member, said second clutch assembly further comprising a drive member rotatable with said first drive shaft, the coupling means of said second clutch assembly comprising an annular solenoid coil unit which is held stationary with respect to the coil unit of the first clutch assembly and which is positioned in coaxially surrounding relationship to said first and second drive shaft, a helical compression spring coaxially surrounding axial portions of the drive and driven members of the second clutch assembly and adapted to radially contract onto said portions of the drive and driven members of the second clutch assembly when twisted about the center axis thereof, and an annular permanent magnet unit axially aligned with said coil unit of the second clutch assembly across said driven member of the second clutch assembly and axially movable into and out of contact with the driven member of the second clutch assembly, said compression spring of the second clutch assembly being anchored at one end to said drive member of the second clutch assembly and at the other end to said magnet unit of the second clutch assembly and urging the magnet unit axially away from the driven member of the second clutch assembly.

3. An air conditioning system for a vehicle having an internal combustion engine and an acceleration producing member, comprising in combination a variable-displacement rotary fluid compressor comprising at least two rotary compressor assemblies consisting of first and second rotary compressor assemblies including respective rotor units rotatable about axes substantially aligned with each other and first and second drive shafts respectively carrying and rotatable with said rotor units, each of the compressor assemblies having a fluid inlet port and a fluid outlet port; members defining a fluid inlet chamber communicating with the respective fluid inlet ports of the first and second compressor assemblies and a fluid outlet chamber communicating with the respective fluid outlet ports of the first and second compressor assemblies; and at least two clutch assemblies consisting of first and second clutch assemblies, the first clutch assembly comprising a drive member which is rotatable about an axis substantially aligned with the axes of rotation of said rotor units and which is to be driven by a drive source, a driven member rotatable with said first drive shaft and releasable coupling means operative to couple the drive and driven members together when actuated, the second clutch assembly comprising a driven member rotatable with said second drive shaft and releasable coupling means operative to couple the respective driven members of the first and second clutch assemblies together when actuated;

a refrigerant evaporator core having refrigerant inlet and outlet ports, the refrigerant outlet port communicating with said fluid inlet chamber of the rotary fluid compressor;

a refrigerant condenser core having refrigerant inlet and outlet ports, the refrigerant inlet port of the condenser core communicating with the fluid outlet chamber of the rotary fluid compressor;

an expansion valve unit having a refrigerant inlet port communicating with the refrigerant outlet port of the condenser core and a refrigerant outlet port communicating with the refrigerant inlet port of said evaporator core;

a conditioned-air temperature sensor which is positioned to be responsive to the temperature of air in the vehicle room and which is operative to detect the temperature of the air circulated through said evaporator core and to produce an output signal representative of the detected temperature of the conditioned air;

a conditioned-air humidity sensor which is positioned to be responsive to the temperature of air in the vehicle room and which is operative to detect the humidity of the air circulated through the evaporator core and to produce an output signal representative of the detected humidity of the conditioned air;

an engine-speed sensor provided in conjunction with the output shaft of the internal combustion engine and operative to detect the revolution speed of the engine output shaft and to produce an output signal representative of the detected revolution speed of the engine output shaft;

an accelerator-position sensor which is provided in conjunction with an acceleration producing member and which is operative to detect the amount of displacement of the acceleration producing member and to produce an output signal representative of the detected amount of displacement of the acceleration producing member; and a compressor control circuit which is responsive to the signals respectively produced by the temperature sensor, humidity sensor, engine-speed sensor and accelerator-position sensor and which is operative to determine, on the basis of these signals, whether only one of said first and second clutch assemblies is to be coupled or both of the first and second rotary clutch assemblies are to be coupled.

4. An air conditioning system as set forth in claim 3, further comprising a second temperature sensor provided on the immediately leeward side of said evaporator core and operative to detect the temperature of the air cooled by the evaporator core and to produce an output signal representative of the detected temperature of the cooled air, said compressor control circuit 94 being further responsive to the signal from the second temperature sensor and being operative to produce an output signal effective to maintain said first clutch assembly in an uncoupled condition when the temperature of air represented by the signal from the second temperature sensor is lower than a predetermined value.

* * * * *